US012586172B2

(12) United States Patent
Horita

(10) Patent No.: US 12,586,172 B2
(45) Date of Patent: Mar. 24, 2026

(54) STRUCTURE DIAGNOSTIC CASE PRESENTATION DEVICE, METHOD, AND PROGRAM

(71) Applicant: FUJIFILM Corporation, Tokyo (JP)

(72) Inventor: Shuhei Horita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 318 days.

(21) Appl. No.: 18/193,390

(22) Filed: Mar. 30, 2023

(65) Prior Publication Data

US 2023/0245296 A1 Aug. 3, 2023

Related U.S. Application Data

(63) Continuation of application No. PCT/JP2021/031912, filed on Aug. 31, 2021.

(30) Foreign Application Priority Data

Oct. 2, 2020 (JP) ................................. 2020-167557

(51) Int. Cl.
*G06T 7/00* (2017.01)
*G06F 16/51* (2019.01)
(Continued)

(52) U.S. Cl.
CPC ............ *G06T 7/0004* (2013.01); *G06F 16/51* (2019.01); *G06F 16/5866* (2019.01); *G06T 3/4038* (2013.01)

(58) Field of Classification Search
CPC .................. G06T 7/0004; G06T 3/4038; G06T 2207/20084; G06T 2207/30132;
(Continued)

(56) References Cited

U.S. PATENT DOCUMENTS 11,016,838 B2 5/2021 Sun et al.
2011/0054806 A1 3/2011 Goldfine et al.
(Continued)

FOREIGN PATENT DOCUMENTS

CN 106056223 A 10/2016
CN 108431585 A 8/2018
(Continued)

OTHER PUBLICATIONS

"Notice of Reasons for Refusal" Office Action issued in JP 2022-553564; mailed by the Japanese Patent Office on Mar. 26, 2025.
(Continued)

*Primary Examiner* — Neil R Mclean
(74) *Attorney, Agent, or Firm* — Studebaker Brackett PLLC

(57) ABSTRACT

Provided are a structure diagnostic case presentation device, method, and program capable of performing support such that a diagnostician can make a more appropriate diagnosis in diagnosing damage of a target structure to be diagnosed. In a case where information (damage information) regarding the target structure to be diagnosed is acquired by a first information acquisition unit (20), a similar damage extraction unit (22-1) extracts similar damage similar to the damage of the target structure from a database (12) based on the acquired damage information. A specific diagnostic case extraction unit (24-1) extracts, as a specific diagnostic case, a diagnostic result that is a diagnostic result of a structure having the extracted similar damage and is a diagnostic result of a structure having different diagnostic results at two points in time or more, from the database (12). Information related to the extracted specific diagnostic case is displayed on a display unit (14).

15 Claims, 6 Drawing Sheets

(51) Int. Cl.
*G06F 16/58* (2019.01)
*G06T 3/4038* (2024.01)

(58) Field of Classification Search
CPC .......... G06T 2207/30136; G06F 16/51; G06F 16/5866; G01N 2021/8887
USPC ......................................................... 382/108
See application file for complete search history.

(56) References Cited

U.S. PATENT DOCUMENTS

| | | |
|---|---|---|
| 2018/0292328 A1 | 10/2018 | Karube |
| 2020/0074730 A1 | 3/2020 | Shloosh et al. |
| 2021/0272263 A1 | 9/2021 | Horita |

FOREIGN PATENT DOCUMENTS

| | | |
|---|---|---|
| CN | 109655680 A | 4/2019 |
| CN | 111104306 A | 5/2020 |
| CN | 111682960 A | 9/2020 |
| EP | 3 633 605 A1 | 4/2020 |
| JP | 2011-145859 A | 7/2011 |
| JP | 2016-126769 A | 7/2016 |
| JP | 2016211955 A * | 12/2016 |
| JP | 2018-198053 A | 12/2018 |
| WO | 2018/207173 A1 | 11/2018 |
| WO | WO-2019163329 A1 * | 8/2019 ............ H04N 23/60 |
| WO | 2020/110587 A1 | 6/2020 |

OTHER PUBLICATIONS

International Search Report issued in PCT/JP2021/031912; mailed Nov. 2, 2021.

International Preliminary Report on Patentability (Chapter I) and Written Opinion of the International Searching Authority issued in PCT/JP2021/031912; issued Mar. 28, 2023.

The extended European search report issued by the European Patent Office on Mar. 13, 2024, which corresponds to European Patent Application No. 21875034.7-1210 and is related to U.S. Appl. No. 18/193,390.

Communication pursuant to Article 94(3) EPC issued in EP 21 875 034.7-1218 by the European Patent Office on Nov. 18, 2025.

Office Action issued in CN 202180064616.3; mailed by the State Intellectual Property Office of the People's Republic of China on Dec. 24, 2025.

\* cited by examiner

| DIAGNOSIS PURPOSE | DIAGNOSTIC RESULT OF FIRST POINT IN TIME | DIAGNOSTIC RESULT OF SECOND POINT IN TIME |
|---|---|---|
| DETERMINATION OF DEGREE OF DAMAGE | a | b |
| DETERMINATION OF COUNTERMEASURE CLASSIFICATION | D | B |
| DETERMINATION OF SOUNDNESS | I | II |
| ESTIMATION OF CAUSE OF DAMAGE | FATIGUE (REPEATEDLY IMPOSED LOAD) | SALT DAMAGE |
| DETERMINATION OF NEED FOR REPAIR | UNNEEDED | NEEDED |
| SELECTION OF REPAIR METHOD | FISSURE REPAIR METHOD | WATERPROOFING METHOD |
| ⋮ | ⋮ | ⋮ |

FIG. 6

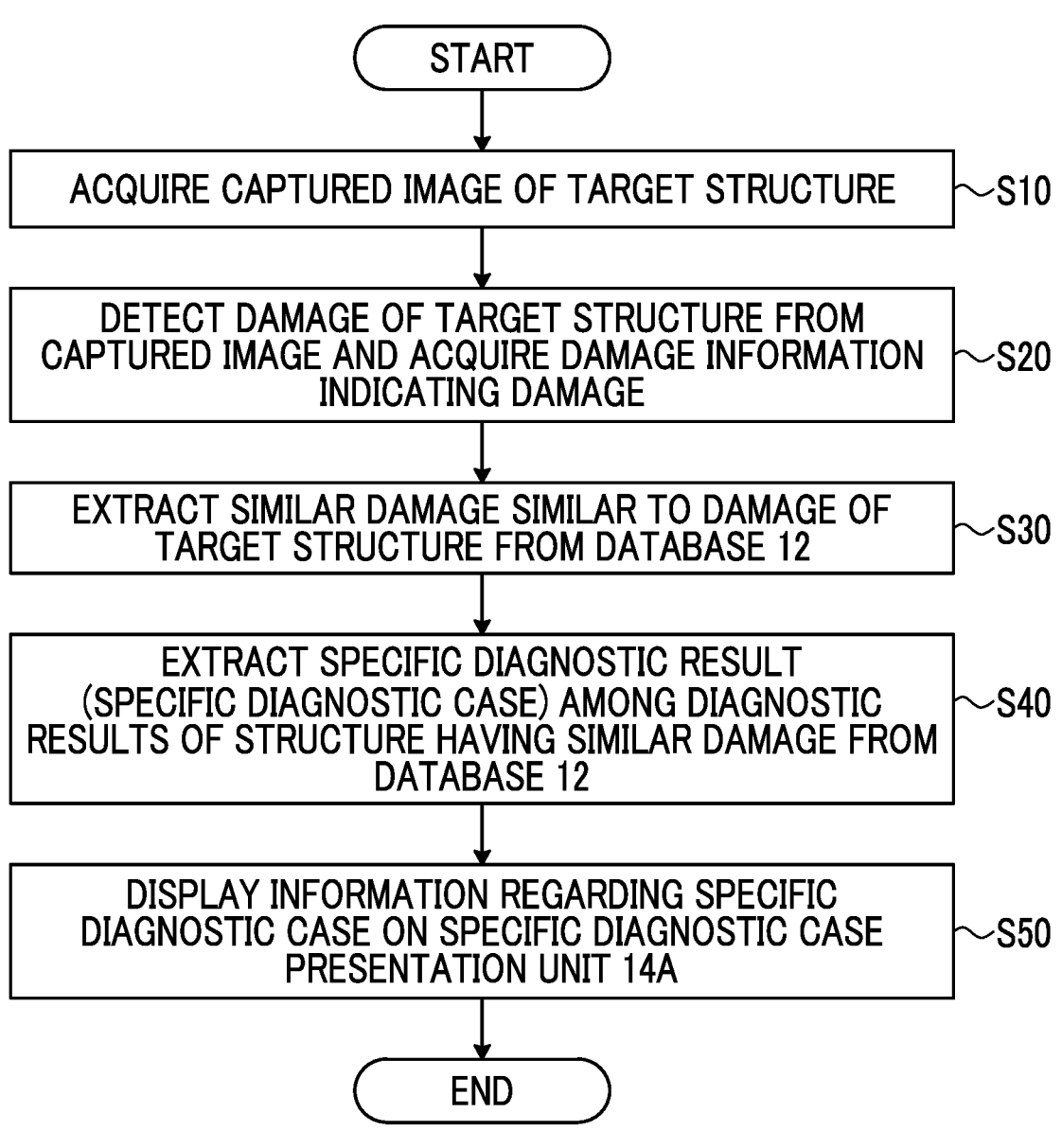

START

ACQUIRE CAPTURED IMAGE OF TARGET STRUCTURE ~S10

DETECT DAMAGE OF TARGET STRUCTURE FROM CAPTURED IMAGE AND ACQUIRE DAMAGE INFORMATION INDICATING DAMAGE ~S20

EXTRACT SIMILAR DAMAGE SIMILAR TO DAMAGE OF TARGET STRUCTURE FROM DATABASE 12 ~S30

EXTRACT SPECIFIC DIAGNOSTIC RESULT (SPECIFIC DIAGNOSTIC CASE) AMONG DIAGNOSTIC RESULTS OF STRUCTURE HAVING SIMILAR DAMAGE FROM DATABASE 12 ~S40

DISPLAY INFORMATION REGARDING SPECIFIC DIAGNOSTIC CASE ON SPECIFIC DIAGNOSTIC CASE PRESENTATION UNIT 14A ~S50

END

STRUCTURE DIAGNOSTIC CASE PRESENTATION DEVICE, METHOD, AND PROGRAM

CROSS-REFERENCE TO RELATED APPLICATIONS

The present application is a Continuation of PCT International Application No. PCT/JP2021/031912 filed on Aug. 31, 2021 claiming priority under 35 U.S.C § 119(a) to Japanese Patent Application No. 2020-167557 filed on Oct. 2, 2020. Each of the above applications is hereby expressly incorporated by reference, in its entirety, into the present application.

BACKGROUND OF THE INVENTION

1. Field of the Invention

The present invention relates to a structure diagnostic case presentation device, method, and program, and in particular, to a technique for presenting information related to a specific diagnostic case prone to misdiagnosis in diagnosing a structure.

2. Description of the Related Art

Hitherto, in a case of diagnosing a structure, a diagnostician visually observes a damaged portion of the structure at a short distance and performs hammering and other examinations as needed to perform diagnosis for damage of the structure from a damage state or the like (determination of the degree of damage, estimation of the cause of damage, determination of the degree of soundness, determination of the need for repair, selection of a repair method, and the like).

In contrast, an information processing device that determines an attribute of a defect of a structure shown in an image has been suggested (JP2018-198053A).

The information processing device described in JP2018-198053A detects a defect, such as a fissure, of a structure in an input image, extracts a feature amount regarding a partial image of the defect from the input image based on a detection result, and determines the attribute of the defect using the extracted feature amount.

In a case where the defect is a fissure, the attribute of the defect is the width of the fissure, the level of danger of the fissure, the cause of the fissure, and the like.

JP2018-198053A has the description that, as the attribute of the defect, a class "misdetection" can be added to a fissure width class.

SUMMARY OF THE INVENTION

By the way, in a case where a diagnostician diagnoses a structure, advanced skills and experience are required, and misdiagnosis may occur due to lack of skills and experience of the diagnostician. The number of skilled diagnosticians is also decreasing.

In a case where misdiagnosis occurs in diagnosis for damage of the structure, there is a problem in that optimum repair is impossible and cost effectiveness of repair decreases.

The information processing device described in JP2018-198053A detects the defect, such as a fissure, of the structure from the input image and determines the attribute of the defect using the feature amount regarding an image portion of the detected defect, but does not support diagnosis of the structure by the diagnostician (in particular, does not perform support for reducing misdiagnosis).

The present invention has been accomplished in view of such a situation, and an object of the present invention is to provide a structure diagnostic case presentation device, method, and program capable of performing support such that a diagnostician can make a more appropriate diagnosis in diagnosing damage of a target structure to be diagnosed.

To achieve the above-described object, a structure diagnostic case presentation device according to a first aspect of the present invention comprises a processor, and a database that stores information regarding a structure including at least one of a captured image of the structure or damage information of the structure and diagnostic results at two points in time or more for damage of the structure in association with each other, in which the processor is configured to acquire information regarding a target structure to be diagnosed including at least one of a captured image or damage information of the target structure, extract similar damage similar to damage of the target structure based on the information regarding the target structure and the information regarding the structure stored in the database, extract, as a specific diagnostic case, a diagnostic result that is a diagnostic result of a structure having the similar damage and is a diagnostic result of a structure having different diagnostic results at two points in time or more, from the database, and output information related to the specific diagnostic case to a display.

According to the first aspect of the present invention, in a case where information regarding the target structure to be diagnosed is acquired, the specific diagnostic case is extracted from the database based on the acquired information of the target structure, and information related to the specific diagnostic case is presented by the display. Here, the specific diagnostic case is a diagnostic case that has the similar damage similar to the damage of the target structure and in which the diagnostic result of the structure having the similar damage is different at two points in time or more. With this, the diagnostician can refer to information related to the presented specific diagnostic case in diagnosing the target structure, and even an unskilled diagnostician can make an appropriate diagnosis.

In a structure diagnostic case presentation device according to a second aspect of the present invention, the specific diagnostic case is a misdiagnosed diagnostic case or a misdiagnosis-prone diagnostic case. This is because the specific diagnostic case has different diagnostic results at two points in time or more.

In a structure diagnostic case presentation device according to a third aspect of the present invention, it is preferable that the damage information stored in the database includes at least one of a type of damage, a position of damage, or a degree of damage of the structure.

In a structure diagnostic case presentation device according to a fourth aspect of the present invention, it is preferable that the database stores at least one of the captured images at a plurality of points in time obtained by imaging the same portion of the structure, the damage information at the plurality of points in time detected from the captured images at the plurality of points in time, or information indicating change with time of the damage information, and the processor is configured to acquire the information regarding the target structure at a plurality of points in time, and detect change with time of the damage information based on the information regarding the target structure at the plurality of points in time and use information indicating the change with time as one kind of information in extracting the similar damage similar to the damage of the target structure from the database.

In a structure diagnostic case presentation device according to a fifth aspect of the present invention, it is preferable that the processor is configured to acquire the captured image of the target structure and information for actual size calculation related to the captured image, and detect the damage of the target structure from the captured image and calculate a degree of the detected damage based on the information for actual size calculation.

In a structure diagnostic case presentation device according to a sixth aspect of the present invention, it is preferable that the processor is configured to acquire a divided captured image group obtained by imaging the target structure in a dividing manner, and combine the divided captured image group in a panoramic manner.

In a structure diagnostic case presentation device according to a seventh aspect of the present invention, it is preferable that the diagnostic result includes at least one of a determination result of a degree of damage, a determination result of a countermeasure classification, a determination result of soundness, an estimation result of a cause of damage, a determination result of a need for repair, or a selection result of a repair method.

In a structure diagnostic case presentation device according to an eighth aspect of the present invention, it is preferable that the diagnostic results at the two points in time or more include the diagnostic result at a first point in time and the diagnostic result at a second point in time that is later than the first point in time, the diagnostic result at the first point in time is the diagnostic result at an initial time of inspection or the diagnostic result at a point in time of regular inspection, and the diagnostic result at the second point in time is the diagnostic result determined by a diagnostician different from a diagnostician at the first point in time, the diagnostic result at a point in time of more detailed examination than examination at the first point in time, or the diagnostic result at a point in time of repair design of the structure.

In a structure diagnostic case presentation device according to a ninth aspect of the present invention, it is preferable that the processor is configured to set the information regarding the target structure as a first feature vector, set the information regarding the structure stored in the database as a second feature vector, calculate a distance in a feature space of the first feature vector and the second feature vector, and extract the similar damage similar to the damage of the target structure from the database based on information regarding the structure having the second feature vector having the distance equal to or less than a threshold value.

In a structure diagnostic case presentation device according to a tenth aspect of the present invention, it is preferable that the processor is configured to extract, as the specific diagnostic case, the diagnostic result that is the diagnostic result of the structure having the similar damage and having different diagnostic results at the two points in time or more, and is the diagnostic result conforming to a diagnosis purpose of the target structure, from the database.

In a structure diagnostic case presentation device according to an eleventh aspect of the present invention, it is preferable that the processor is configured to extract the specific diagnostic case having a highest degree of similarity or a plurality of high-rank specific diagnostic cases having a high degree of similarity.

In a structure diagnostic case presentation device according to a twelfth aspect of the present invention, it is preferable that the information regarding the structure stored in the database includes at least one of the captured image of the structure or the damage information of the structure and at least one of structure information, environment information, history information, or examination information of the structure, and the information regarding the target structure acquired in the information acquisition processing includes at least one of the captured image of the target structure or the damage information of the target structure and at least one of structure information, environment information, history information, or examination information of the target structure.

In a structure diagnostic case presentation device according to a thirteenth aspect of the present invention, it is preferable that the processor is configured to extract at least one piece of similar damage, extract at least one specific diagnostic case, calculate a misdiagnosis rate of the specific diagnostic case based on the number of extracted similar damage and the number of extracted specific diagnostic cases, and output at least one specific diagnostic case among the extracted specific diagnostic cases and the misdiagnosis rate to the display.

A structure diagnostic case presentation method according to a fourteenth aspect of the present invention comprises, via a processor, acquiring information regarding a target structure to be diagnosed including at least one of a captured image or damage information of the target structure, extracting similar damage similar to damage of the target structure based on the information regarding the target structure and information regarding the structure stored in a database, extracting, as a specific diagnostic case, a diagnostic result that is a diagnostic result of a structure having the similar damage and is a diagnostic result of a structure having different diagnostic results at two points in time or more stored in the database, from the database, and outputting information related to the specific diagnostic case to a display.

A structure diagnostic case presentation program according to a fifteenth aspect of the present invention causes a computer to realize acquiring information regarding a target structure to be diagnosed including at least one of a captured image or damage information of the target structure, extracting similar damage similar to damage of the target structure based on the information regarding the target structure and information regarding the structure stored in a database, extracting, as a specific diagnostic case, a diagnostic result that is a diagnostic result of a structure having the similar damage and is a diagnostic result of a structure having different diagnostic results at two points in time or more stored in the database, from the database, and outputting information related to the specific diagnostic case to a display.

According to the present invention, in a case where a diagnostician diagnoses damage of the target structure to be diagnosed, since information related to the specific diagnostic case is presented, even an unskilled diagnostician can make a more appropriate diagnosis.

BRIEF DESCRIPTION OF THE DRAWINGS

FIG. 2 is a block diagram showing a first embodiment of the structure diagnostic case presentation device according to the aspect of the present invention.

FIG. 5 is a chart showing a type of a diagnosis purpose and diagnostic results at two points in time for each diagnosis purpose.

FIG. 6 is a flowchart illustrating an embodiment of a structure diagnostic case presentation method according to the aspect of the present invention.

DESCRIPTION OF THE PREFERRED
EMBODIMENTS

Hereinafter, a preferred embodiment of a structure diagnostic case presentation device, method, and program according to an aspect of the present invention will be described referring to the accompanying drawings.

Hardware Configuration of Structure Diagnostic
Case Presentation Device

Figure 1:
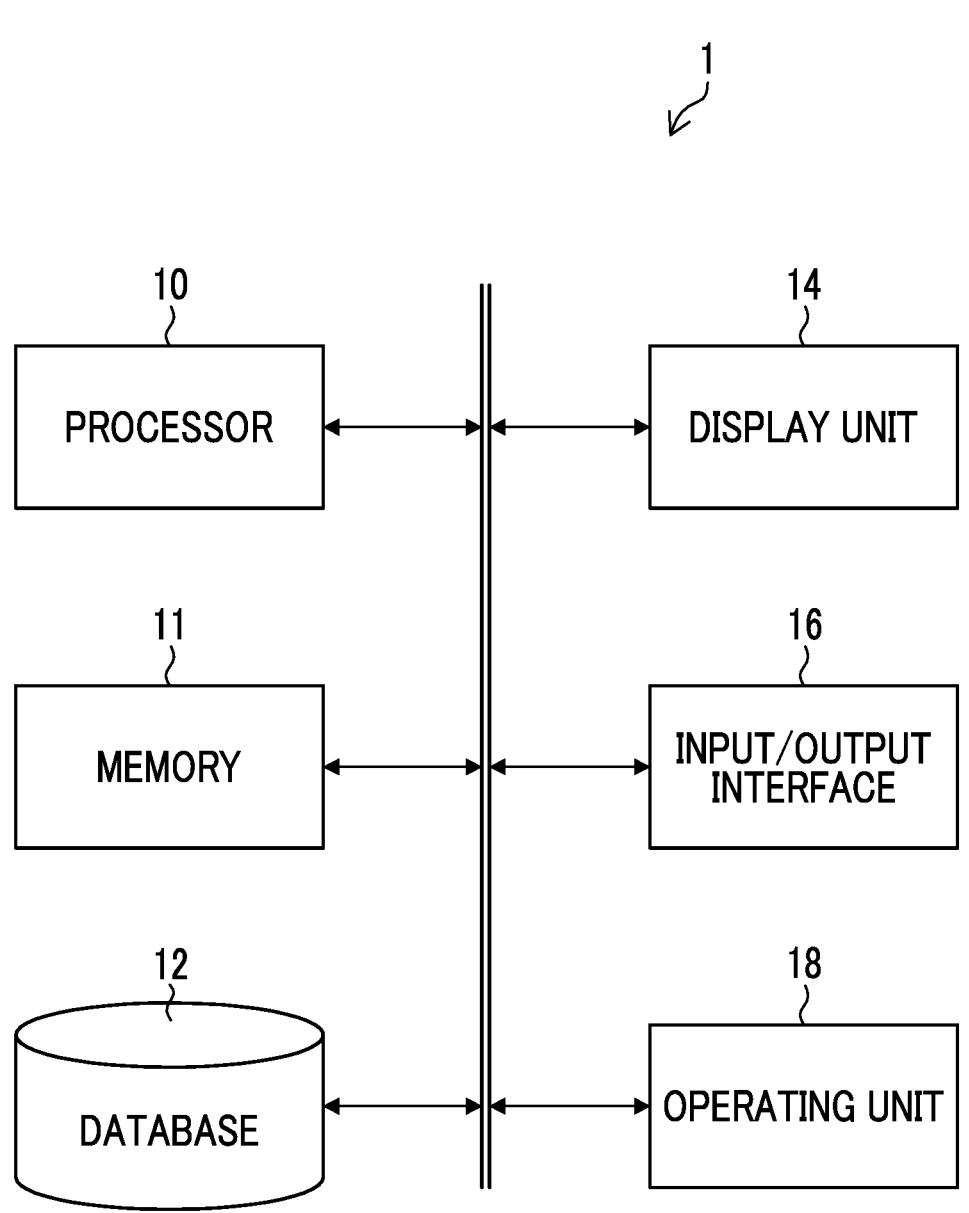
FIG. 1 is a block diagram showing an embodiment of a hardware configuration of a structure diagnostic case presentation device according to an aspect of the present invention.

FIG. 1 is a block diagram showing an embodiment of a hardware configuration of the structure diagnostic case presentation device according to the aspect of the present invention.

As shown in FIG. 1, a structure diagnostic case presentation device 1 can be configured with a personal computer, a workstation, or the like, and comprises a processor 10, a memory 11, a database 12, a display unit (display) 14, an input/output interface 16, an operating unit 18, and the like.

Figure 2:
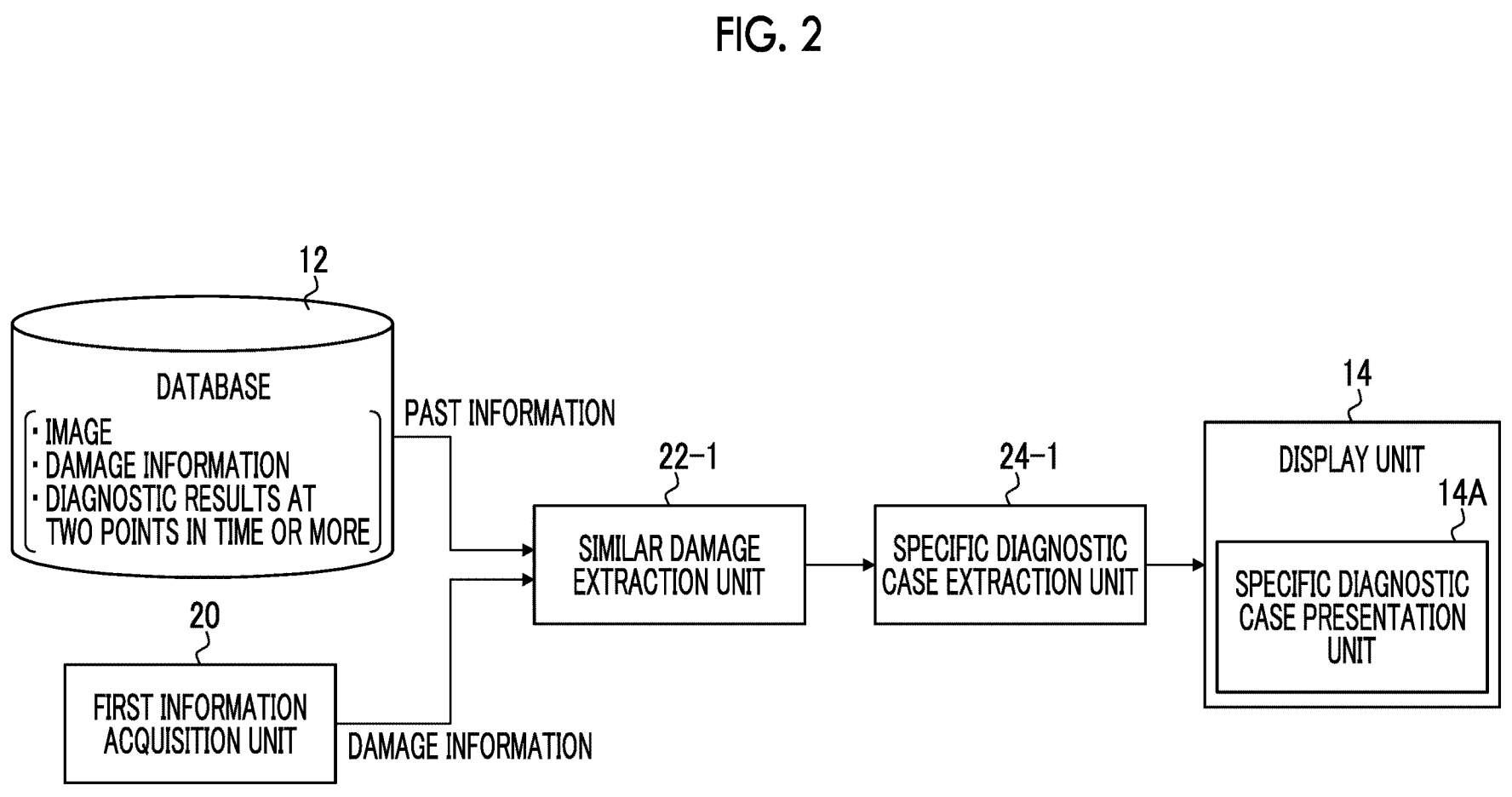

The processor 10 is configured with a central processing unit (CPU) or the like, integrally controls each unit of the structure diagnostic case presentation device 1, and functions as, for example, a first information acquisition unit 20, a similar damage extraction unit 22-1, and a specific diagnostic case extraction unit 24-1 shown in FIG. 2.

Here, the structure includes a building structure, for example, a civil engineering structure, such as a bridge, a tunnel, or a dam, and further includes an architectural structure, such as a building, a house, a wall of a building, a post, and a girder.

In a case where the first information acquisition unit 20 acquires information regarding a target structure to be diagnosed, the processor 10 extracts a specific diagnostic case from the database 12 that stores information (past information) regarding the structure, and outputs information related to the extracted specific diagnostic case to the display unit 14 by the similar damage extraction unit 22-1 and the specific diagnostic case extraction unit 24-1. The details of the first information acquisition unit 20, the similar damage extraction unit 22-1, and the specific diagnostic case extraction unit 24-1 shown in FIG. 2 will be described below.

The memory 11 includes a flash memory, a read-only memory (ROM), a random access memory (RAM), and the like. The flash memory and the ROM are non-volatile memories that store various programs and the like, such as an operating system and the structure diagnostic case presentation program according to the aspect of the present invention. The RAM functions as a work area of processing by the processor 10. The RAM temporarily stores the structure diagnostic case presentation program and the like stored in the flash memory and the like. The processor 10 may incorporate a part (RAM) of the memory 11. The structure diagnostic case presentation program may be distributed in a state of being recorded on an external recording medium (not shown), and may be installed from the recording medium by the processor 10. Alternatively, the structure diagnostic case presentation program may be stored in a server or the like connected to a network in a state of being accessible from the outside, may be downloaded to the flash memory or the ROM by the processor 10 depending on a request, and may be installed and executed.

The processor 10 performs control of each unit of the structure diagnostic case presentation device 1 and processing while using the RAM as a work area, following the structure diagnostic case presentation program.

The database 12 is a part that stores and manages information regarding a structure and diagnostic results at two points in time or more for damage of the structure in association with each other. The details of information regarding the structure and the diagnostic results at two points in time or more for damage of the structure that are managed by the database 12 will be described below.

The display unit 14 displays information related to the specific diagnostic case extracted by the processor 10 based on information regarding the target structure to be diagnosed. A diagnostician can make a diagnosis with reference to information related to the specific diagnostic case presented to the display in diagnosing the target structure. The display can be used as a part of a user interface in a case of receiving an instruction of the diagnostician.

The input/output interface 16 includes a connection unit that can be connected to external equipment, a communication unit that can be connected to a network, and the like. As the connection unit that can be connected to the external equipment, a universal serial bus (USB), a high-definition multimedia interface (HDMI (Registered Trademark)), or the like can be applied. The processor 10 can acquire information and the like regarding a desired target structure through the input/output interface 16. Instead of the display unit 14, external display equipment connected to the input/output interface 16 can be used.

The operating unit 18 includes, a pointing device, such as a mouse, and a keyboard, and functions as a user interface that receives various designations by the diagnostician.

First Embodiment of Structure Diagnostic Case
Presentation Device

FIG. 2 is a block diagram showing a first embodiment of the structure diagnostic case presentation device according to the aspect of the present invention.

The structure diagnostic case presentation device of the first embodiment shown in FIG. 2 is configured with the processor 10, the database 12, and the display unit 14 of the structure diagnostic case presentation device 1 having the hardware configuration shown in FIG. 1, and the processor 10 functions as the first information acquisition unit 20, the similar damage extraction unit 22-1, and the specific diagnostic case extraction unit 24-1.

The first information acquisition unit 20 that functions as an input unit executes information acquisition processing of acquiring information regarding the target structure including at least one of a captured image or damage information of the target structure to be diagnosed in response to an instruction from the diagnostician. In this example, it is assumed that the first information acquisition unit 20 acquires the damage information of the target structure.

The damage information of the target structure acquired by the first information acquisition unit 20 is output to the similar damage extraction unit 22-1.

The database 12 is a part that stores and manages information regarding a number of structures diagnosed in the past and diagnostic results at two points in time or more for damage of the structures in association with each other.

Information regarding the structure includes at least one of a captured image of the structure or damage information of the structure. The damage information includes at least one of a type of damage, a position of damage, or a degree of damage of the structure. The damage information may include an image (damage image) indicating damage detected from the captured image of the structure.

Example of Diagnostic Results at Two Points in Time or More

The diagnostic results at two points in time or more include a diagnostic result at a first point in time and a diagnostic result at a second point in time that is a point in time later than the first point in time.

As the diagnostic result at the first point in time, a diagnostic result at an initial time of inspection or a diagnostic result at a point in time of regular inspection in which visual inspection is performed is considered.

As the diagnostic result at the second point in time, a diagnostic result determined by a diagnostician (for example, a consultative body, such as a result confirmation conference, that determines diagnosis) different from the diagnostician at the first point in time, a diagnostic result at a point in time of more detailed examination than visual examination (at a point in time of examination, such as destructive examination or nondestructive examination, in addition to visual examination), or a diagnostic result at a point in time of repair design of the structure is considered.

The diagnostic results at two points in time or more are identical or different, and the diagnostic result at the later point in time is more probable than the earlier diagnostic result.

Example of Diagnostic Result

The diagnostic result includes at least one of a determination result of a degree of damage, a determination result of a countermeasure classification, a determination result of soundness, an estimation result of a cause of damage, a determination result of a need for repair, or a selection result of a repair method described below.

Determination Result of Degree of Damage
  Determination result of degree a/b/c/d/e of damage (reference: Bridge Regular Inspection Outline: Ministry of Land, Infrastructure, Transport and Tourism)
Determination Result of Countermeasure Classification
  Determination result of countermeasure classification: A/B/C/E and the like(reference: Bridge Regular Inspection Outline: Ministry of Land, Infrastructure, Transport and Tourism)
  A: There is no need to perform repair.
  B: There is a need to perform repair depending on a situation.
  C1: There is a need to quickly perform repair or the like from a viewpoint of preventive maintenance.
  C2: There is a need to quickly perform repair or the like from a viewpoint of safety of a bridge structure.
  E1: There is a need for emergency response from a viewpoint of safety of a bridge structure.
  E2: There is a need for emergency response from other viewpoints.
  M: There is a need for response in maintenance work.

S1: There is a need for detailed investigation.
S2: There is a need for follow-up investigation.
Determination Result of Soundness
  Soundness: I/II/III/IV (Reference: Bridge Regular Inspection Outline: Ministry of Land, Infrastructure, Transport and Tourism)
Example of Cause of Damage

Case of Concrete Member

Deterioration: fatigue (repeatedly imposed load), salt damage, neutralization, alkali-aggregate reaction, frost damage, chemical erosion
  Construction Factor: heat of hydration during construction, drying shrinkage
  Structural Factor: application of excessive external force, inappropriate design

Case of Steel Member

Deterioration: fatigue (repeatedly imposed load), salt damage
  Structural Factor: application of excessive external force, inappropriate design
Determination Result of Need for Repair
  Repair needed/unneeded
Selection Result of Repair Method

Example of Repair Method

Example of Repair Method of Concrete Member

Fissure repair method (fissure injection method, fissure filling method), cross section repair method (plastering method, spraying method, filling method), surface treatment method (surface coating method, surface impregnation method), replacement method, flaking prevention method, electrolytic protection method, desalination method, re-alkalization method, waterproofing method

Example of Repair Method of Steel Member

Splice-plate reinforcement method, member replacement method, repainting method, waterproofing method/water cutoff method, drilled hole method, welding repair method, bolt replacement, type of repairing material Since the repair performance varies depending on not only the type of the repair method but also the type (a manufacturer and a model number) of the repairing material, the selection of the repair method is a concept including the selection of the type of the repair method and the repairing material.

The similar damage extraction unit 22-1 extracts information similar to information regarding the target structure among information regarding the structures stored in the database 12 (information regarding a number of structures diagnosed in the past), based on information regarding the target structure.

Determination of similarity can be performed based on the damage information, such as the type of damage, the position of damage, the degree of damage (length, width, area, density, depth, or the like) (average value, maximum value, or the like).

The determination of similarity can be performed based on change with time of the position and degree of damage, in addition to the damage information. In this case, the database 12 needs to store at least one of captured images at a plurality of points in time obtained by imaging the same portion of the structure, damage information at a plurality of points in time detected from the captured images at a plurality of points in time, or information indicating the change with time of the damage information, and the first information acquisition unit 20 needs to acquire information regarding the target structure at a plurality of points in time.

Similar damage extraction processing by the similar damage extraction unit 22-1 detects the change with time of the damage information based on information regarding the target structure at a plurality of points in time, and information indicating the change with time can be used as one kind of information in extracting similar damage similar to the damage of the target structure from the database 12. With this, it is possible to extract the specific diagnostic case having similar change with time of the damage information. In regard to "a plurality of points in time" at which the captured images obtained by imaging the same portion of the structure and the damage information detected from the captured images, stored in the database 12 are acquired and "a plurality of points in time" at which information regarding the target structure is acquired, all points in time of acquisition may be identical, a part of points in time of acquisition may be identical, or all points in time of acquisition may not be identical.

The similar damage extraction unit 22-1 may perform determination of similarity taking into account information other than the damage information, for example, at least one of structure information, environment information, history information, or examination information of the structure. The details of the structure information, the environment information, the history information, and the examination information of the structure will be described below.

The specific diagnostic case extraction unit 24-1 extracts a specific diagnostic result (specific diagnostic case) among diagnostic results of a structure having similar damage extracted by the similar damage extraction unit 22-1 (that is, diagnostic results associated with information of similar damage) from the database 12. The diagnostic result that is extracted as the specific diagnostic case is a diagnostic result of a structure having different diagnostic results at two points in time or more.

That is, the specific diagnostic case is a past diagnostic result having damage similar to the damage of the target structure and is a diagnostic result (misdiagnostic result or easy-to-mistake diagnostic result) having different diagnostic results at two points in time or more.

The processor 10 outputs information related to the specific diagnostic case extracted by the specific diagnostic case extraction unit 24-1 to the display unit 14.

The display unit 14 displays information related to the specific diagnostic case on a specific diagnostic case presentation unit 14A. Information related to the specific diagnostic case includes the specific diagnostic case or information for alerting a misdiagnosis-prone case separately from the specific diagnostic case or in conjunction with the specific diagnostic case.

It is preferable that the captured image, the damage information, and the like corresponding to the specific diagnostic case are displayed on the display unit 14. In addition, a captured image, a damage image, a damage diagram, and the like of the target structure can be displayed on the display unit 14.

The diagnostician can make a diagnosis with reference to information related to the specific diagnostic case presented on the specific diagnostic case presentation unit 14A in diagnosing the target structure, and as a result, even an unskilled diagnostician can make an appropriate diagnosis.

Second Embodiment of Structure Diagnostic Case Presentation Device

Figure 3:
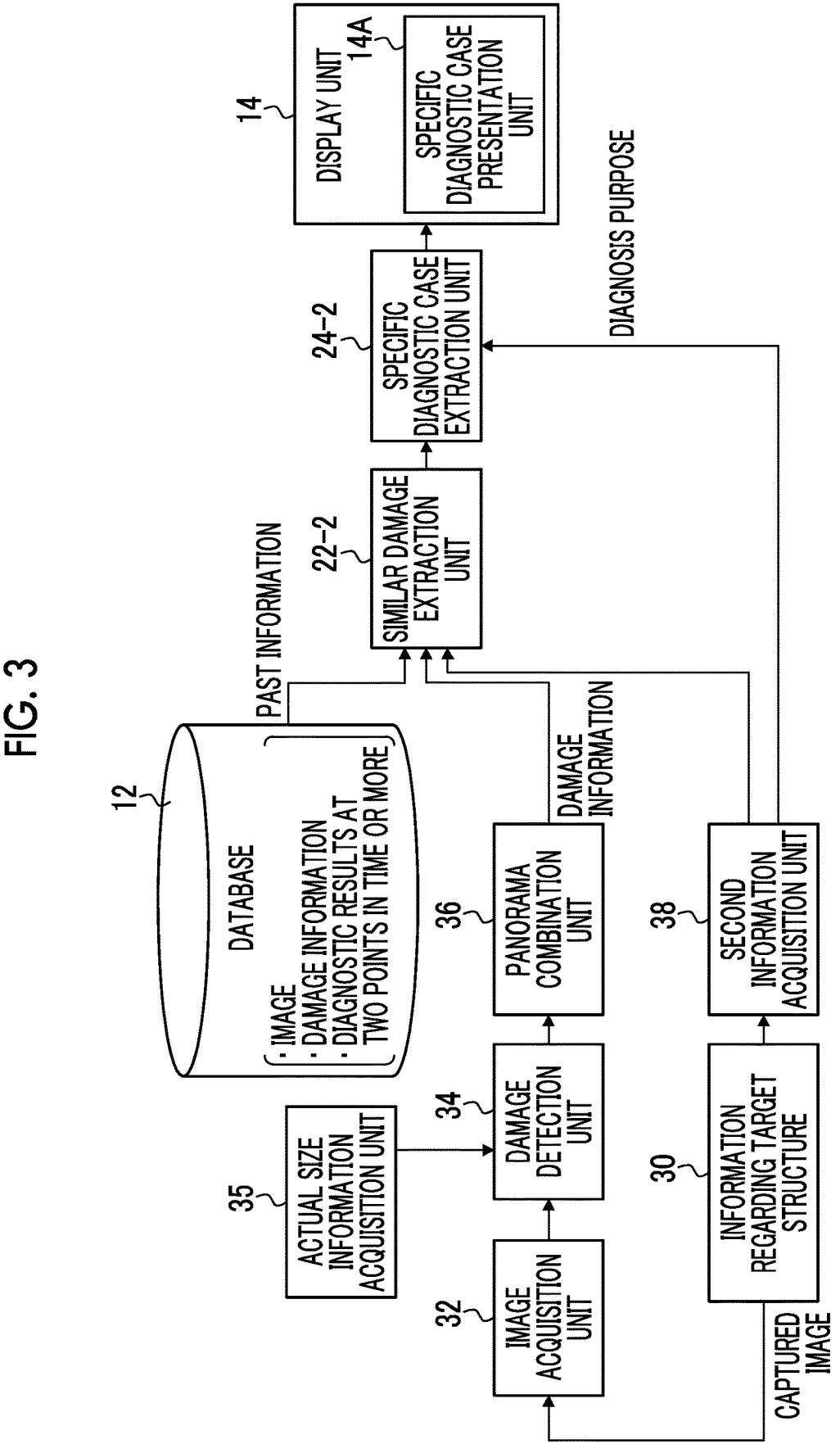
FIG. 3 is a block diagram showing a second embodiment of the structure diagnostic case presentation device according to the aspect of the present invention.

FIG. 3 is a block diagram showing a second embodiment of the structure diagnostic case presentation device according to the aspect of the present invention.

The structure diagnostic case presentation device of the second embodiment shown in FIG. 3 is configured with the processor 10, the database 12, and the display unit 14 of the structure diagnostic case presentation device 1 having the hardware configuration shown in FIG. 1, and the processor 10 functions as an image acquisition unit 32, a damage detection unit 34, an actual size information acquisition unit 35, a panorama combination unit 36, a second information acquisition unit 38, a similar damage extraction unit 22-2, and a specific diagnostic case extraction unit 24-2.

The image acquisition unit 32, the damage detection unit 34, the actual size information acquisition unit 35, and the panorama combination unit 36 are a part corresponding to the first information acquisition unit 20 shown in FIG. 2, and generate damage information based on the captured image of the target structure included in information 30 regarding the target structure.

That is, the image acquisition unit 32 acquires the captured image of the target structure to be diagnosed in response to an instruction from the diagnostician and outputs the acquired captured image to the damage detection unit 34.

The damage detection unit 34 executes damage detection processing of detecting damage of the target structure shown in the captured image based on the captured image of the target structure input from the image acquisition unit 32. As the damage detection unit 34, for example, a trained model, such as a convolution neural network (CNN), which performs machine learning to detect damage can be applied; however, the present invention is not limited thereto, and damage may be detected by a detection algorithm.

To the other input of the damage detection unit 34, information (actual size information) for actual size calculation is applied from the actual size information acquisition unit 35 related to the actual size of the target structure. The actual size information is an actual size of a feature portion (for example, the length or the width of a steel member) of the target structure in the captured image or the resolution (mm/pixel) of an object.

The damage detection unit 34 detects the damage of the target structure, and can detect the size of damage (in a case where damage is a fissure, the fissure length or fissure width) the degree of damage based on the actual size information. With this, it is possible to extract the specific diagnostic case having a similar degree (size) of damage.

The damage detection unit 34 can detect as the damage of the concrete member, damage, such as a fissure, water leakage/free lime, peeling/exposure of reinforcement steel, delamination, surface bubbles, honeycomb, cold joint, placing joint line, sand streak, or sludge leakage, and can detect, as damage of a steel member, damage, such as fracture, corrosion, deterioration of anti-corrosion function. A damage detection result may be appropriately corrected by the diagnostician.

As the damage information that is detected by the damage detection unit 34, at least one of the type of damage, the position of damage, or the degree (length, width, area, density, depth, average value, maximum value, or the like) of damage of the structure may be included.

For example, in a case where the image acquisition unit 32 acquires a divided captured image group obtained by imaging the target structure in a dividing manner, the panorama combination unit 36 executes combination processing of combining the divided captured image group in a panoramic manner and combining the damage information (damage image) in conjunction in a panoramic manner.

In a case where a desired resolution (for example, a resolution necessary for detecting a fissure of 0.1 mm) is not obtained with one captured image obtained by imaging the target structure, the target structure is imaged in a dividing manner (imaging including an overlap portion between adjacent images) to acquire a divided captured image group. Then, the divided captured image group is combined in a panoramic manner, and the damage information is combined in conjunction in a panoramic manner. In this way, for example, in a case where a fissure is captured over a plurality of captured images, a fissure in each captured image can be connected. In a case where the desired resolution is obtained by one captured image, it is possible to omit the panorama combination by the panorama combination unit 36.

The damage information of the target structure generated in this manner is output to the similar damage extraction unit 22-2.

The second information acquisition unit 38 acquires information (other information) other than the captured image in information 30 regarding the target structure, as second information.

Other Information

As other information, at least one of structure information, environment information, history information, or examination information of the structure described below is included.

Structure Information: structure type (in case of bridge: girder bridge, rigid-frame bridge, truss bridge, arch bridge, cable-stayed bridge, suspension bridge), member type (in case of bridge: deck slab, pier, abutment, girder, . . . ), material (steel, reinforced concrete, prestressed concrete (PC), . . . ), or the like Environment Information: volume of traffic (daily, monthly, yearly, accumulative, or the like), distance from the sea, weather (average temperature, average humidity, rainfall, snowfall, or the like)

History Information: construction condition (temperature during construction or the like), the number of elapsed years (completion date, service start date, the number of elapsed years therefrom, or the like), repair history, disaster history (earthquake/typhoon/flood, or the like)

Examination Information: monitoring information (deflection of structure/amplitude of vibration/period of vibration, or the like), coring test information, nondestructive examination information (ultrasonic wave, radar, infrared ray, hammering, or the like)

Other information can include a diagnosis purpose of the target structure. The diagnosis purpose is determination of the degree of damage, determination of the countermeasure classification, determination of soundness, estimation of the cause of damage, determination of the need for repair, selection of the repair method, and the like.

The second information acquisition unit 38 acquires other information (second information) in information 30 regarding the target structure, outputs the second information to the similar damage extraction unit 22-2, and outputs information indicating the diagnosis purpose to the specific diagnostic case extraction unit 24-2. Information indicating the diagnosis purpose is not limited as being output from the second information acquisition unit 38 to the specific diagnostic case extraction unit 24-2, and the diagnostician may be input information indicating the diagnosis purpose to the specific diagnostic case extraction unit 24-2 using the operating unit 18.

The similar damage extraction unit 22-2 extracts information (information having similar damage information and other information) similar to information regarding the target structure among information regarding a number of past structures stored in the database 12, based on information regarding the target structure including the damage information of the target structure input from the panorama combination unit 36 and the second information (other information) input from the second information acquisition unit 38.

Figure 4:
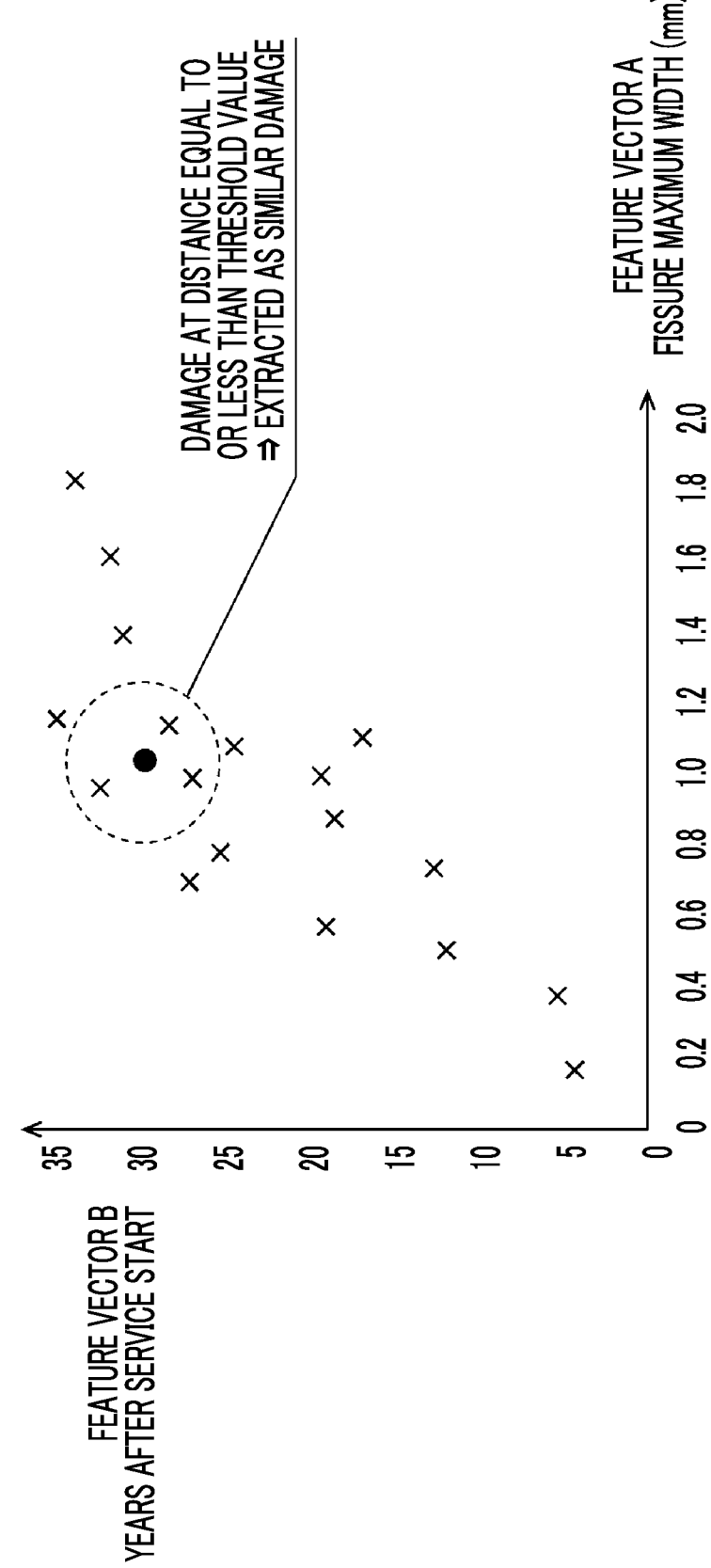
FIG. 4 is a diagram showing an example of an extraction method of similar damage by a similar damage extraction unit.

FIG. 4 is a diagram showing an example of an extraction method of similar damage by the similar damage extraction unit.

In FIG. 4, in a feature space of a feature vector A and a feature vector B, a lot of damage information regarding the structures stored in the database 12 and damage information of a target to be diagnosed at the present time are plotted.

On FIG. 4, the damage information regarding the structures stored in the database 12 is indicated by a mark x, and the damage information of the target to be diagnosed at the present time is indicated by a mark ●. The feature vector A indicates a fissure maximum width (mm), and the feature vector B indicates the number of years after a service start of the structure. Although a feature space by feature vectors can be set as a multi-dimensional space including three or more feature vectors, in FIG. 4, a two-dimensional space including two feature vectors is shown for simplification.

The similar damage extraction unit 22-2 calculates a distance between the feature vector (first feature vector) of the damage information of the target to be diagnosed at the present time indicated by the mark ● and the feature vector (second feature vector) of the damage information indicated by the mark x in the feature space shown in FIG. 4, and extracts the damage information indicated by the mark x at the distance equal to or less than a threshold value (on FIG. 4, within a circle shown by a dotted line) as similar damage. The threshold value can be optimized by a statistical scheme.

The distance may be a distance (Euclidean distance) in a case where a plurality of parameters of the first feature vector and the second feature vector are not weighted or may be a distance (Mahalanobis distance) in a case where a plurality of parameters of the first feature vector and the second feature vector are weighted. A parameter and a weight that is allocated to the parameter may be determined by a statistical scheme, such as principal component analysis.

In addition to the determination described above, an additional search condition can also be designated as a point or a range in the feature space. For example, in a case where it is designated that a structure is a bridge on a completion date after Jan. 1, 1990, a basic structure is a girder bridge, and the like, it is possible to extract damage similar to damage of the structure within a designated range.

In addition to the above, the damage information, the structure information, the environment information, the history information, the examination information, or the like included in other information can be set as the axis of the feature space, and similar damage can be extracted.

As a scheme of similar damage extraction, a scheme different from the scheme for performing determination with the distance in the feature space may be used. For example, similar damage extraction may be performed with artificial intelligence (AI) that determines a degree of similarity from images, AI that determines a degree of similarity by combining a plurality of kinds of information among images, damage information, and other information, or the like.

Similarly to the specific diagnostic case extraction unit 24-1 shown in FIG. 2, the specific diagnostic case extraction unit 24-2 extracts, as the specific diagnostic case, the diagnostic result of the structure having different diagnostic results at two points in time or more among the diagnostic results of the structure having similar damage, from the database 12, and further extracts the specific diagnostic case under a condition that the diagnosis purpose conforms to the diagnosis purpose of the target structure.

FIG. 5 is a chart showing the type of the diagnosis purpose and diagnostic results at two points in time for each diagnosis purpose. FIG. 5 shows a case where the diagnostic results at two points in time (first point in time and second point in time) are different.

In a case where information regarding the diagnosis purpose input from the second information acquisition unit 38 indicates, for example, the determination of soundness, the specific diagnostic case extraction unit 24-2 extracts a specific diagnostic case in which determination results of soundness at two points in time are different. Two or more diagnosis purposes may be provided. In this case, while it is preferable that a specific diagnostic case in which each diagnostic result is different at two points in time for two or more diagnosis purposes is extracted, a specific diagnostic case in which one or more diagnostic results are different at two points in time for two or more diagnosis purposes may be extracted.

In a case where a plurality of specific diagnostic cases are detected, the specific diagnostic case extraction unit 24-2 may extract a specific diagnostic case having a highest degree of similarity or may extract a plurality of high-rank specific diagnostic cases (for example, top three ranks) having a high degree of similarity.

The display unit 14 displays information related to the specific diagnostic case extracted by the specific diagnostic case extraction unit 24-2 on the specific diagnostic case presentation unit 14A. In a case where a plurality of high-rank specific diagnostic cases having a high degree of similarity are extracted by the specific diagnostic case extraction unit 24-2, a plurality of specific diagnostic cases may be displayed in parallel in a descending order of the degree of similarity or a plurality of specific diagnostic cases may be scroll-displayed in a descending order of the degree of similarity depending on a scroll operation of the diagnostician.

The display unit 14 can display information 30 regarding the target structure (the captured image of the target structure and other information), the damage information, and the like.

The diagnostician can make a diagnosis with reference to information related to the specific diagnostic case presented on the specific diagnostic case presentation unit 14A in diagnosing the target structure, and as a result, even an unskilled diagnostician can make an appropriate diagnosis.

The processor 10 can execute misdiagnosis rate calculation processing of calculating a misdiagnosis rate of the specific diagnostic case based on the number of pieces of similar damage extracted by the similar damage extraction unit 22-1 or 22-2 (similar damage extraction processing) and the number of specific diagnostic cases extracted by the specific diagnostic case extraction unit 24-1 or 24-2 (specific diagnostic case extraction processing). The processor 10 extracts at least one piece of similar damage in the similar damage extraction unit 22-1 or 22-2 (similar damage extraction processing). The processor 10 extracts at least one specific diagnostic case in the specific diagnostic case extraction unit 24-1 or 24-2 (specific diagnostic case extraction processing).

The misdiagnosis rate can be obtained by a ratio of the total number of pieces of similar damage and the number of specific diagnostic cases having different diagnostic results at two points in time among the similar damage.

The processor 10 can display the specific diagnostic cases and the misdiagnosis rate on the display unit 14. The processor 10 can display at least one specific diagnostic case and the misdiagnosis rate on the display unit 14. The misdiagnosis rate is presented along with the specific diagnostic case, whereby the diagnostician can determine whether or not the damage of the target structure is likely to be misdiagnosed, and can make a diagnosis more cautiously with reference to the specific diagnostic case in a case where the misdiagnosis rate is high.

Structure Diagnostic Case Presentation Method

FIG. 6 is a flowchart showing an embodiment of the structure diagnostic case presentation method according to the aspect of the present invention. Processing of each step shown in FIG. 6 is executed by the processor 10 of the structure diagnostic case presentation device 1 shown in FIG. 1.

In FIG. 6, the processor 10 acquires the captured image of the target structure to be diagnosed in response to an instruction from the diagnostician (Step S10).

The processor 10 detects the damage of the target structure shown in the captured image based on the captured image of the target structure and acquires the damage information indicating the damage (Step S20, damage detection processing and information acquisition processing).

The processor 10 extracts the similar damage similar to the damage of the target structure from the database 12 based on information regarding the target structure including the damage information and information regarding the structures stored in the database 12 (Step S30, similar damage extraction processing).

Subsequently, the processor 10 extracts the specific diagnostic result (the specific diagnostic result having different diagnostic results at two points in time or more) among the diagnostic results of the structure having similar damage extracted in the Step S30 from the database 12 (Step S40, specific diagnostic case extraction processing). The specific diagnostic result is a misdiagnosed diagnostic result or a misdiagnosis-prone diagnostic result since the diagnostic results at two points in time or more are different diagnostic results.

The processor 10 outputs information related to the specific diagnostic case extracted in Step S40 to the display unit 14 and displays information related to the specific diagnostic case on the specific diagnostic case presentation unit 14A (Step S50, output processing). It is preferable that, as information related to the specific diagnostic case, the captured image, the damage information, and the like corresponding to the specific diagnostic case are included, in addition to the diagnostic result having different diagnostic results at two points in time or more.

With this, the diagnostician can make a diagnosis with reference to information related to the specific diagnostic case presented on the specific diagnostic case presentation unit 14A in diagnosing the target structure, and even an unskilled diagnostician can make an appropriate diagnosis.

Others

In the present embodiment, although the specific diagnostic case having different diagnostic results at two points in time or more is extracted from among the diagnostic results of the structures having the similar damage similar to the damage of the target structure, the present invention is not limited thereto, and the diagnostic results of the structures having the similar damage similar to the damage of the target structure may be extracted as specific diagnostic cases from among cases having different diagnostic results at two points in time or more.

In the present embodiment, for example, hardware structures of processing units that execute various kinds of processing, such as a CPU, and the database 12 are various processors described below. Various processors include a central processing unit (CPU) that is a general-purpose processor configured to execute software (program) to function as various processing units, a programmable logic device (PLD) that is a processor capable of changing a circuit configuration after manufacture, such as a field programmable gate array (FPGA), a dedicated electric circuit that is a processor having a circuit configuration dedicatedly designed for executing specific processing, such as an application specific integrated circuit (ASIC), and the like.

One processing unit may be configured with one of various processors described above or may be configured with two or more processors (for example, a plurality of FPGAs or a combination of a CPU and an FPGA) of the same type or different types. A plurality of processing units may be configured with one processor. As an example where a plurality of processing units are configured with one processor, first, as represented by a computer, such as a client or a server, there is a form in which one processor is configured with a combination of one or more CPUs and software, and the processor functions as a plurality of processing units. Second, as represented by system on chip (SoC) or the like, there is a form in which a processor that realizes the functions of the entire system including a plurality of processing units with one integrated circuit (IC) chip is used. In this way, various processing units are configured using one or more processors among various processors described above as a hardware structure.

The hardware structure of various processors described above is more specifically an electric circuit (circuitry) in which circuit elements, such as semiconductor elements, are combined.

The present invention includes a structure diagnostic case presentation program that is installed on a computer to cause the computer to function as the structure diagnostic case presentation device according to the present invention, and a non-volatile storage medium recording the structure diagnostic case presentation program.

It is needless to say that the present invention is not limited to the above-described embodiment, and various modifications can be made without departing from the spirit of the present invention.

EXPLANATION OF REFERENCES

1: diagnostic case presentation device
10: processor
11: memory

12: database
14: display unit
14A: specific diagnostic case presentation unit
16: input/output interface
18: operating unit
20: first information acquisition unit
22-1, 22-2: similar damage extraction unit
24-1, 24-2: specific diagnostic case extraction unit
32: image acquisition unit
34: damage detection unit
35: actual size information acquisition unit
36: panorama combination unit
38: second information acquisition unit
S10 to S50: step

What is claimed is:

1. A structure diagnostic case presentation device comprising:

a processor; and a database that stores information regarding a structure including, at least one of a captured image of the structure and damage information of the structure, at least the damage information and diagnostic results at two points in time or more for damage of the structure in association with each other, wherein the processor is configured to:

detect damage information of a target structure to be diagnosed using a trained model to which a captured image of the target structure is input and acquire information regarding the target structure including at least the damage information of the captured image and the damage information;

extract, from the database, similar damage similar to the acquired damage of the target structure based on the acquired information regarding the target structure and the information regarding the structure which is stored in the database;

extract, as a specific diagnostic case, a diagnostic result that is a diagnostic result of the structure having the extracted similar damage and is a diagnostic result of the structure having different diagnostic results at two points in time or more stored in the database, from the database; and output information related to the extracted specific diagnostic case to a display.

2. The structure diagnostic case presentation device according to claim 1, wherein the specific diagnostic case is a misdiagnosed diagnostic case or a misdiagnosis-prone diagnostic case.

3. The structure diagnostic case presentation device according to claim 1, wherein the damage information stored in the database includes at least one of a type of damage, a position of damage, or a degree of damage of the structure.

4. The structure diagnostic case presentation device according to claim 1, wherein the database stores at least one of the captured images at a plurality of points in time obtained by imaging the same portion of the structure, the damage information at the plurality of points in time detected from the captured images at the plurality of points in time, or information indicating change with time of the damage information, and the processor is configured to:

acquire the information regarding the target structure at a plurality of points in time; and detect change with time of the damage information based on the information regarding the target structure at the plurality of points in time and use information indicating the change with time as one kind of information in extracting the similar damage similar to the damage of the target structure from the database.

5. The structure diagnostic case presentation device according to claim 1,
   wherein the processor is configured to:
   acquire the captured image of the target structure and information for actual size calculation related to the captured image; and
   detect the damage of the target structure from the captured image and calculate a degree of the detected damage based on the information for actual size calculation.

6. The structure diagnostic case presentation device according to claim 1,
   wherein the processor is configured to:
   acquire a divided captured image group obtained by imaging the target structure in a dividing manner; and
   combine the divided captured image group in a panoramic manner.

7. The structure diagnostic case presentation device according to claim 1,
   wherein the diagnostic result includes at least one of a determination result of a degree of damage, a determination result of a countermeasure classification, a determination result of soundness, an estimation result of a cause of damage, a determination result of a need for repair, or a selection result of a repair method.

8. The structure diagnostic case presentation device according to claim 1,
   wherein the diagnostic results at the two points in time or more include the diagnostic result at a first point in time and the diagnostic result at a second point in time that is later than the first point in time,
   the diagnostic result at the first point in time is the diagnostic result at an initial time of inspection or the diagnostic result at a point in time of regular inspection, and
   the diagnostic result at the second point in time is the diagnostic result determined by a diagnostician different from a diagnostician at the first point in time, the diagnostic result at a point in time of more detailed examination than examination at the first point in time, or the diagnostic result at a point in time of repair design of the structure.

9. The structure diagnostic case presentation device according to claim 1,
   wherein the processor is configured to set the information regarding the target structure as a first feature vector, set the information regarding the structure stored in the database as a second feature vector, calculate a distance in a feature space of the first feature vector and the second feature vector, and extract the similar damage similar to the damage of the target structure from the database based on information regarding the structure having the second feature vector having the distance equal to or less than a threshold value.

10. The structure diagnostic case presentation device according to claim 1,
   wherein the processor is configured to extract, as the specific diagnostic case, the diagnostic result that is the diagnostic result of the structure having the similar damage and having different diagnostic results at the two points in time or more, and is the diagnostic result conforming to a diagnosis purpose of the target structure, from the database.

11. The structure diagnostic case presentation device according to claim 1,
   wherein the processor is configured to extract the specific diagnostic case having a highest degree of similarity or a plurality of high-rank specific diagnostic cases having a high degree of similarity.

12. The structure diagnostic case presentation device according to claim 1,
   wherein the information regarding the structure stored in the database includes at least one of the captured image of the structure or the damage information of the structure and at least one of structure information, environment information, history information, or examination information of the structure, and
   the information regarding the target structure includes at least one of the captured image of the target structure or the damage information of the target structure and at least one of structure information, environment information, history information, or examination information of the target structure.

13. The structure diagnostic case presentation device according to claim 1,
   wherein the processor is configured to:
   extract at least one piece of similar damage;
   extract at least one specific diagnostic case;
   calculate a misdiagnosis rate of the specific diagnostic case based on the number of extracted similar damage and the number of extracted specific diagnostic cases; and
   output at least one specific diagnostic case among the extracted specific diagnostic cases and the misdiagnosis rate to the display.

14. A structure diagnostic case presentation device comprising:
   a processor; and
   a database that stores information regarding a structure including at least one of a captured image of the structure or damage information of the structure and diagnostic results at two points in time or more for damage of the structure in association with each other,
   wherein the processor is configured to:
   acquire information regarding a target structure to be diagnosed including at least one of a captured image or damage information of the target structure;
   extract, from the database, using a trained model, similar damage similar to the acquired damage of the target structure based on the acquired information regarding the target structure and the information regarding the structure which is stored in the database;
   extract, as a specific diagnostic case, a diagnostic result that is a diagnostic result of the structure having the extracted similar damage and is a diagnostic result of the structure having different diagnostic results at two points in time or more stored in the database, from the database; and
   output information related to the extracted specific diagnostic case to a display.

15. A structure diagnostic case presentation device comprising:
   a processor; and
   a database that stores information regarding a structure including at least one of a captured image of the structure or damage information of the structure and diagnostic results at two points in time or more for damage of the structure in association with each other, wherein the processor is configured to:

acquire information regarding a target structure to be diagnosed including at least one of a captured image or damage information of the target structure;

extract similar damage similar to damage of the target structure based on the information regarding the target structure and the information regarding the structure stored in the database;

extract, as a specific diagnostic case, a diagnostic result that is a diagnostic result of a structure having the similar damage and is a diagnostic result of a structure having different diagnostic results at two points in time or more, from the database; and output information related to the specific diagnostic case to a display, and wherein the processor is configured to:

acquire a divided captured image group obtained by imaging the target structure in a dividing manner; and combine the divided captured image group in a panoramic manner.

*   *   *   *   *